United States Patent
Fukunaga (10) Patent No.: US 10,923,279 B2
(45) Date of Patent: Feb. 16, 2021

(54) MULTILAYER CERAMIC ELECTRONIC COMPONENT

(71) Applicant: Murata Manufacturing Co., Ltd., Nagaokakyo (JP)

(72) Inventor: Daiki Fukunaga, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/656,899

(22) Filed: Oct. 18, 2019

(65) Prior Publication Data

US 2020/0126722 A1    Apr. 23, 2020

(30) Foreign Application Priority Data

Oct. 22, 2018  (JP) ................. 2018-198420
Oct. 22, 2018  (JP) ................. 2018-198424
Aug. 28, 2019  (JP) ................. 2019-155766

(51) Int. Cl.
*H01G 4/30* (2006.01)
*H01G 4/12* (2006.01)
*H01G 4/005* (2006.01)

(52) U.S. Cl.
CPC .......... *H01G 4/1209* (2013.01); *H01G 4/005* (2013.01); *H01G 4/306* (2013.01)

(58) Field of Classification Search
None
See application file for complete search history.

(56) References Cited

U.S. PATENT DOCUMENTS

| | | | | |
|---|---|---|---|---|
| 6,225,250 B1* | 5/2001 | Wada | ................. | H01G 4/1227 501/137 |
| 6,829,136 B2* | 12/2004 | Nakamura | ............... | H01G 4/30 361/321.2 |
| 7,796,373 B2* | 9/2010 | Sasabayashi | ............ | H01B 3/12 361/321.4 |
| 7,911,764 B2* | 3/2011 | Sasabayashi | ....... | C04B 35/6262 361/321.4 |
| 2014/0301015 A1* | 10/2014 | Kim | ........................ | H01G 4/12 361/301.4 |
| 2015/0340155 A1* | 11/2015 | Fukunaga | .............. | H01G 4/012 361/301.4 |
| 2017/0018363 A1* | 1/2017 | Tanaka | ..................... | H01G 4/30 |

(Continued)

FOREIGN PATENT DOCUMENTS

JP    2017-028013 A    2/2017
JP    2017-147429 A    8/2017

*Primary Examiner* — Dion Ferguson
(74) *Attorney, Agent, or Firm* — Keating & Bennett, LLP (57) ABSTRACT

A multilayer ceramic electronic component includes a laminate, a first external electrode on a first end surface of the laminate, and a second external electrode on a second end surface of the laminate. The laminate includes a central layer portion in which each first internal electrode layer and each second internal electrode layer oppose each other with a dielectric ceramic layer therebetween, peripheral layer portions sandwiching the central layer portion in a lamination direction, and side margins sandwiching the central layer portion and the peripheral layer portions in a width direction. The side margins each include an inner layer disposed closest to the laminate, an outer layer disposed farthest from the laminate, and a buffer layer disposed between the inner layer and the outer layer.

16 Claims, 5 Drawing Sheets

(56) References Cited

U.S. PATENT DOCUMENTS

| | | | |
|---|---|---|---|
| 2017/0169952 A1* | 6/2017 | Kato | H01G 4/005 |
| 2017/0243697 A1* | 8/2017 | Mizuno | H01G 4/232 |
| 2019/0115153 A1* | 4/2019 | Park | H01G 4/1209 |
| 2019/0180936 A1* | 6/2019 | Cha | C04B 35/47 |
| 2020/0051741 A1* | 2/2020 | Park | H01G 4/0085 |
| 2020/0126722 A1* | 4/2020 | Fukunaga | H01G 4/224 |

* cited by examiner

MULTILAYER CERAMIC ELECTRONIC COMPONENT

CROSS REFERENCE TO RELATED APPLICATIONS

This application claims the benefit of priority to Japanese Patent Application No. 2018-198420 filed on Oct. 22, 2018, Japanese Patent Application No. 2018-198424 filed on Oct. 22, 2018 and Japanese Patent Application No. 2019-155766 filed on Aug. 28, 2019. The entire contents of these applications are hereby incorporated herein by reference.

BACKGROUND OF THE INVENTION

1. Field of the Invention

The present invention relates to a multilayer ceramic electronic component.

2. Description of the Related Art

Examples of multilayer ceramic electronic components include a multilayer ceramic capacitor. The multilayer ceramic capacitor includes, for example, a laminate in which dielectric ceramic layers and internal electrode layers are alternately laminated and dielectric ceramic layers are further laminated on the top and bottom surfaces thereof, and an external electrode formed on both end surfaces of the laminate. Some of such multilayer ceramic capacitors include a ceramic layer called "side margin" on each lateral surface in order to prevent connection between the internal electrode layer and the external electrode at the lateral surface of the laminate.

For example, JP 2017-28013 A discloses a multilayer ceramic capacitor in which a side margin includes multiple side margin layers, and side margin layers other than the side margin layer closest to the internal electrode side have a higher Si content than the side margin layer closest to the internal electrode side.

For example, JP 2017-147429 A discloses a multilayer ceramic capacitor including a laminate portion, a side margin, and a joint portion. The laminate portion includes multiple ceramic layers that are made of a first ceramic having a first average crystal grain size and that are laminated in a first direction, and internal electrodes each disposed between the ceramic layers. The side margin is made of a second ceramic having a second average crystal grain size, and the side margin covers the laminate portion in a second direction perpendicular or substantially perpendicular to the first direction. The joint portion is made of third ceramic having a third average crystal grain size larger than the first and second average crystal grain sizes, and the joint portion is disposed between the laminate portion and each side margin.

In the multilayer ceramic capacitor disclosed in JP 2017-28013 A, the Si content is higher in the side margin layers other than the side margin layer closest to the internal electrode side, and the strength of the side margin can thus be increased, which is considered to increase the folding strength of the multilayer ceramic capacitor. Further, the side margin is less prone to cracking and chipping, and moisture intrusion can be prevented, which is considered to ensure insulation of the multilayer ceramic capacitor.

Yet, when the side margin has a high Si content, Si may spread from the side margin layer side to a dielectric ceramic layer side of a central layer portion where the internal electrodes are disposed to face each other with a dielectric ceramic layer therebetween in the laminate. Spread of Si to the dielectric ceramic layer side of the central layer portion may accelerate ceramic grain growth in the central layer portion, which may decrease the quality of the multilayer ceramic capacitor.

In the multilayer ceramic capacitor disclosed in JP 2017-147429 A, each joint portion made of a ceramic having an average crystal grain size larger than that of ceramic defining the ceramic layers of the laminate portion and the side margin is disposed between the laminate portion and the side margin. Thus, the number of crystal grains in contact with the laminate portion and the side margin decreases on both interfaces of the joint portion. In other words, on both interfaces of the joint portion, there are less grain boundaries that tend to be sites of the onset of cracking and separation of laminate portion and the side margins, so that the laminate portion and the side margins are considered to maintain a good joined state via the joint portion.

Yet, J P 2017-147429 A is silent about alleviating stress externally applied to the side margin. Thus, there is room for improvement in making the multilayer ceramic capacitor less prone to cracking and chipping.

These problems are not limited to multilayer ceramic capacitors but are common to multilayer ceramic electronic components other than the multilayer ceramic capacitors.

SUMMARY OF THE INVENTION

Preferred embodiments of the present invention provide multilayer ceramic electronic components in each of which the side margins are made dense and which can reduce or prevent ceramic grain growth in the central layer portion.

Preferred embodiments of the present invention also provide multilayer ceramic electronic components in each of which stress externally applied to the side margins can be reduced or prevented.

A multilayer ceramic electronic component according to a preferred embodiment of the present invention includes a laminate including multiple dielectric ceramic layers and multiple pairs of a first internal electrode layer and a second internal electrode layer laminated in a lamination direction. The laminate includes a first main surface and a second main surface that oppose each other in the lamination direction, a first lateral surface and a second lateral surface that oppose each other in a width direction perpendicular or substantially perpendicular to the lamination direction, and a first end surface and a second end surface that oppose each other in a longitudinal direction perpendicular or substantially perpendicular to the lamination direction and the width direction. The multilayer ceramic electronic component further includes a first external electrode on the first end surface of the laminate and connected to the first internal electrode layer on the first end surface and a second external electrode on the second end surface of the laminate and connected to the second internal electrode layer on the second end surface. The laminate includes a central layer portion in which each first internal electrode layer and each second internal electrode layer oppose each other with the dielectric ceramic layer therebetween, peripheral layer portions sandwiching the central layer portion in the lamination direction, and side margins sandwiching the central layer portion and the peripheral layer portions in the width direction. The side margins each include multiple ceramic layers laminated in the width direction, and the ceramic layers include an inner layer closest to the laminate and an outer layer disposed farthest from the laminate and including a larger amount of a sintering aid element than the inner layer, and a buffer layer disposed between the inner layer and the outer layer and including a smaller amount of the sintering aid element than the outer layer.

A multilayer ceramic electronic component according to a preferred embodiment of the present invention includes a laminate including multiple dielectric ceramic layers and multiple pairs of a first internal electrode layer and a second internal electrode layer laminated in a lamination direction, and including a first main surface and a second main surface that oppose each other in the lamination direction, a first lateral surface and a second lateral surface that oppose each other in a width direction perpendicular or substantially perpendicular to the lamination direction, and a first end surface and a second end surface that oppose each other in a longitudinal direction perpendicular or substantially perpendicular to the lamination direction and the width direction. The multilayer ceramic electronic component further includes a first external electrode on the first end surface of the laminate and connected to the first internal electrode layer on the first end surface and a second external electrode on the second end surface of the laminate and connected to the second internal electrode layer on the second end surface. The laminate includes a central layer portion in which each first internal electrode layer and each second internal electrode layer oppose each other with the dielectric ceramic layer therebetween, peripheral layer portions sandwiching the central layer portion in the lamination direction, and side margins sandwiching the central layer portion and the peripheral layer portions in the width direction. The side margins each include multiple ceramic layers laminated in the width direction, and the ceramic layers include an inner layer disposed closest to the laminate, an outer layer disposed farthest from the laminate, and a buffer layer disposed between the inner layer and the outer layer and having a lower elastic modulus than the inner layer and the outer layer.

According to preferred embodiments of the present invention, it is possible to provide multilayer ceramic electronic components in each of which the side margins are made dense and which can reduce or prevent ceramic grain growth in the central layer portion and in each of which stress externally applied to the side margins can be alleviated.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of multilayer ceramic electronic components according to the present invention are described in detail below with reference to the drawings.

The present invention is not limited to the following preferred embodiments, and may be suitably modified without departing from the gist of the present invention. Combinations of two or more preferred features described in the following preferred embodiments are also within the scope of the present invention.

The following preferred embodiments are examples, and features of different preferred embodiments can be partially exchanged or combined with each other. In the second preferred embodiment and subsequent preferred embodiments, a description of features common to the first preferred embodiment is omitted, and only different points are described. In particular, similar advantageous effects by similar features are not mentioned in each preferred embodiment.

Multilayer ceramic capacitors are described as example preferred embodiments of the multilayer ceramic electronic components of the present invention. The present invention is also applicable to multilayer ceramic electronic components other than the multilayer ceramic capacitors. Examples of such multilayer ceramic electronic components include inductors, piezoelectric elements, and thermistors.

First Preferred Embodiment

Multilayer Ceramic Capacitor

Figure 1:
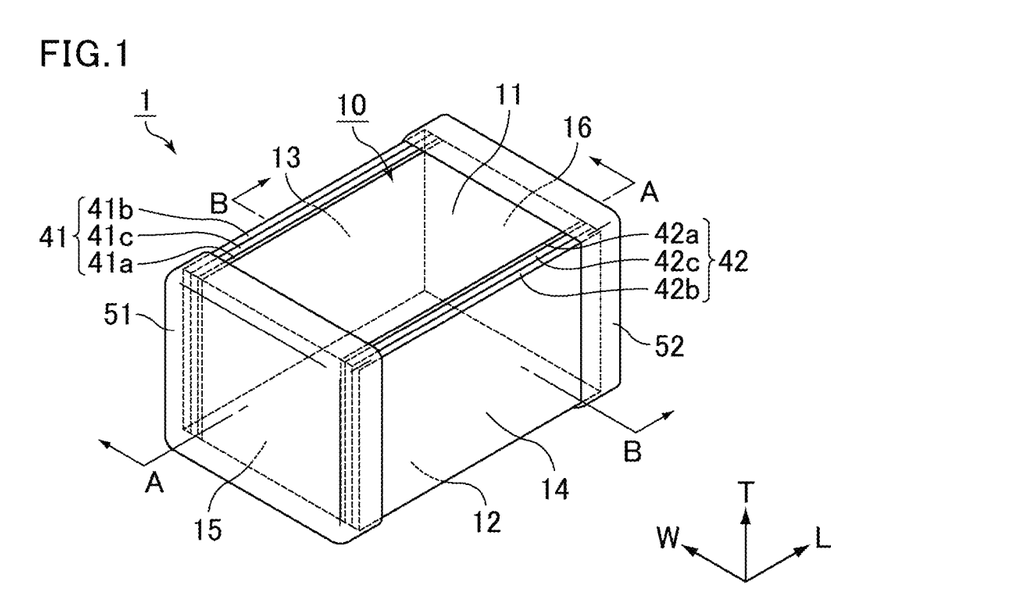
FIG. 1 is a perspective view schematically showing an example multilayer ceramic capacitor according to a first preferred embodiment of the present invention.
Figure 2:
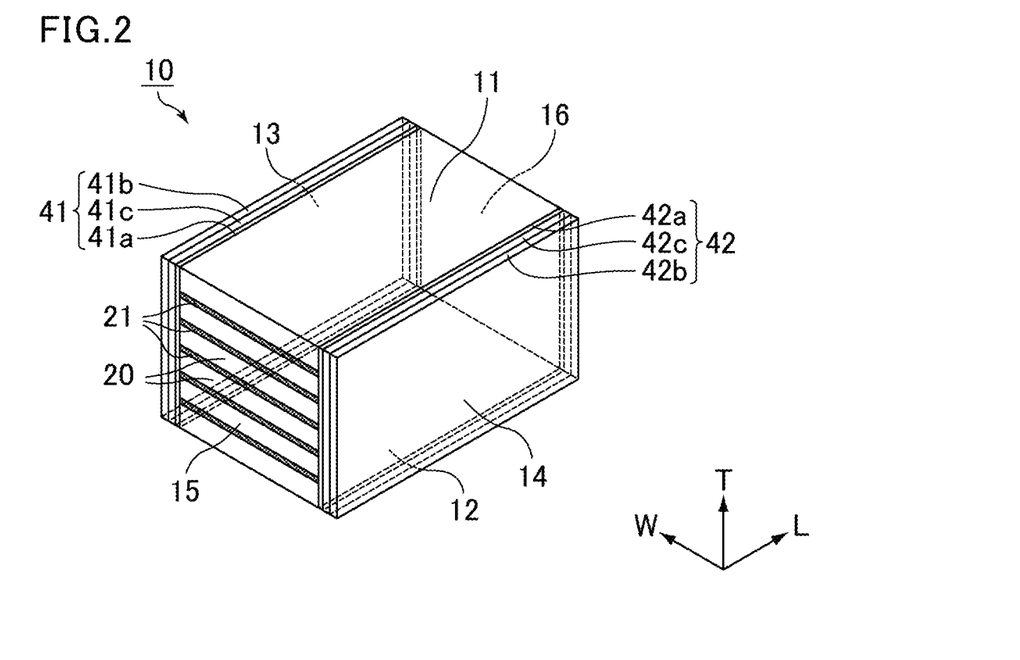
FIG. 2 is a perspective view schematically showing an example laminate defining the multilayer ceramic capacitor shown in FIG. 1.

FIG. 1 is a perspective view schematically showing an example multilayer ceramic capacitor according to the first preferred embodiment of the present invention. FIG. 2 is a perspective view schematically showing an example laminate defining the multilayer ceramic capacitor shown in FIG. 1. FIG. is a cross-sectional view taken along the line A-A of the multilayer ceramic capacitor shown in FIG. 1. FIG. 4 is a cross-sectional view taken along the line B-B of the multilayer ceramic capacitor shown in FIG. 1.

Herein, the lamination direction, width direction, and longitudinal direction of the multilayer ceramic capacitor and the laminate indicate directions specified by arrows T, W, and L, respectively, in a multilayer ceramic capacitor 1 shown in FIG. 1 and a laminate 10 shown in FIG. 2. The lamination (T) direction, the width (W) direction, and the longitudinal (L) direction are perpendicular or substantially perpendicular to each other. The lamination (T) direction is a direction in which multiple dielectric ceramic layers 20 and multiple pairs of a first internal electrode layer 21 and a second internal electrode layer 22 are stacked.

The multilayer ceramic capacitor 1 shown in FIG. 1 includes the laminate 10, a first external electrode 51 on one end surface of the laminate 10, and a second external electrode 52 on the other end surface of the laminate 10.

The size of the multilayer ceramic capacitor 1 represented by dimensions of the longitudinal (L) direction×the width (W) direction×the lamination (T) direction is preferably, for example, 1.6 mm×0.8 mm×0.8 mm, 1.0 mm×0.5 mm×0.5 mm, 0.6 mm×0.3 mm×0.3 mm, 0.4 mm×0.2 mm×0.2 mm, 0.2 mm×0.1 mm×0.1 mm, including approximate dimensions or the like.

As shown in FIG. 2, the laminate 10 is preferably a rectangular cuboid or a substantially rectangular cuboid. The laminate 10 includes a first main surface 11 and a second main surface 12 that oppose each other in the lamination (T) direction, a first lateral surface 13 and a second lateral surface 14 that oppose each other in the width (W) direction perpendicular or substantially perpendicular to the lamination (T) direction, and a first end surface 15 and a second end surface 16 in the longitudinal (L) direction perpendicular or substantially perpendicular to the lamination (T) direction and the width (W) direction.

Herein, a cross section of the multilayer ceramic capacitor 1 or the laminate 10 which is perpendicular or substantially perpendicular to the first end surface 15 and the second end surface 16 and parallel or substantially parallel to the lamination (T) direction is referred to as an LT cross section that is a cross section in the longitudinal (L) direction and the lamination (T) direction. A cross section of the multilayer ceramic capacitor 1 or the laminate 10 which is perpendicular or substantially perpendicular to the first lateral surface 13 and the second lateral surface 14 and parallel or substantially parallel to the lamination (T) direction is referred to as a WT cross section that is a cross section in the width (W) direction and the lamination (T) direction. A cross section of the multilayer ceramic capacitor 1 or the laminate 10 perpendicular or substantially perpendicular to the first lateral surface 13, the second lateral surface 14, the first end surface 15, and the second end surface 16, and perpendicular or substantially perpendicular to the lamination (T) direction is referred to as an LW cross section that is a cross section in the longitudinal (L) direction and the width (W) direction. Thus, FIG. 3 shows the LT cross section of the multilayer ceramic capacitor 1, and FIG. 4 shows the WT cross section of the multilayer ceramic capacitor 1.

In the laminate 10, corners and edges are preferably rounded. The corner is a portion where three surfaces of the laminate meet, and the edge is a portion where two surface of the laminate meet.

Figure 3:
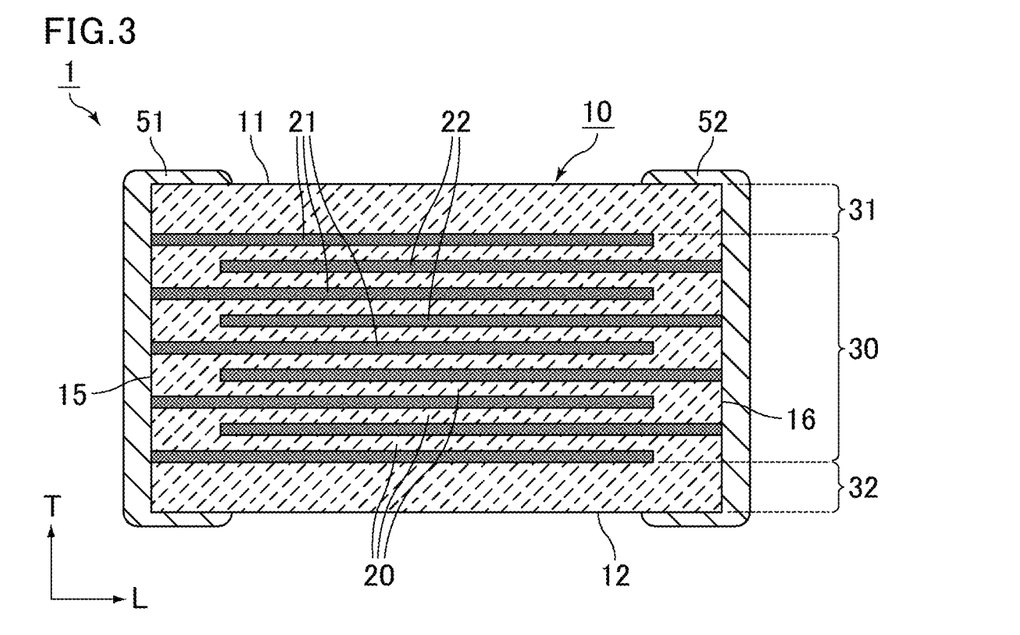
FIG. 3 is a cross-sectional view taken along the line A-A of the multilayer ceramic capacitor shown in FIG. 1.
Figure 4:
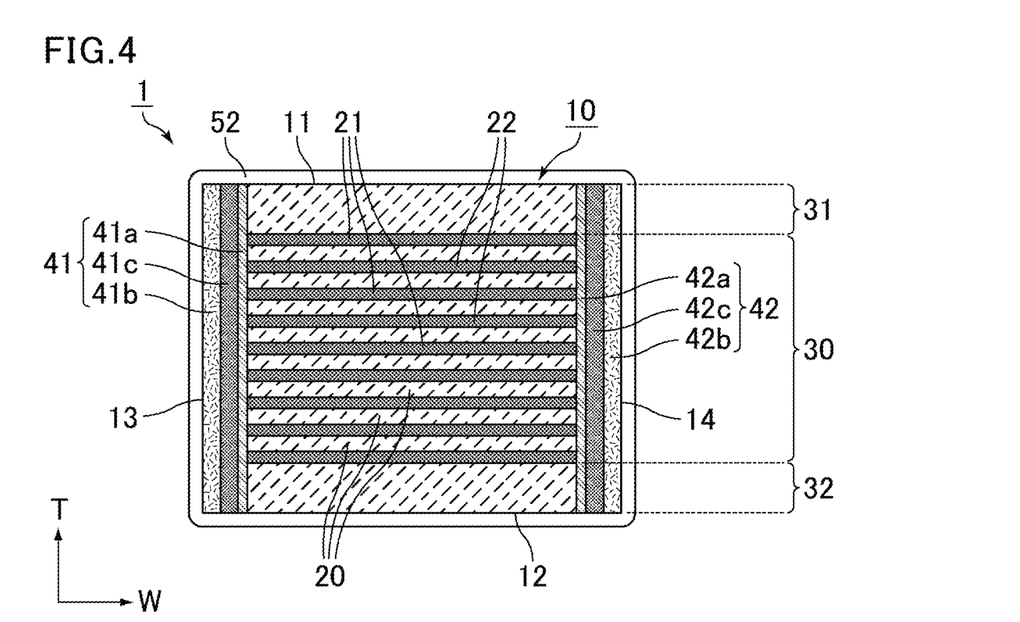
FIG. 4 is a cross-sectional view taken along the line B-B of the multilayer ceramic capacitor shown in FIG. 1.

As shown in FIG. 2, FIG. 3, and FIG. 4, the laminate 10 preferably has a laminated structure including the multiple dielectric ceramic layers 20 stacked in the lamination (T) direction and the first internal electrode layer 21 and the second internal electrode layer 22 alternately provided along the interface between each dielectric ceramic layer 20. The dielectric ceramic layers 20 extend in the width (W) direction and the longitudinal (L) direction, and the first internal electrode layers 21 and the second internal electrode layers 22 each flatly extend along the dielectric ceramic layer 20.

The first internal electrode layers 21 are led out to the first end surface 15 of the laminate 10. The second internal electrode layers 22 are led out to the second end surface 16 of the laminate 10.

Each first internal electrode layer 21 and each second internal electrode layer 22 oppose each other with the dielectric ceramic layer 20 therebetween in the lamination (T) direction. Capacitance is generated from each portion where the first internal electrode layer 21 and the second internal electrode layer 22 oppose each other with the dielectric ceramic layer 20 therebetween.

The first internal electrode layers 21 and the second internal electrode layers 22 each preferably include one or more metals such as Ni, Cu, Ag, Pd, Ag—Pd alloy, and Au, for example. In addition to the one or more metals, the first internal electrode layers 21 and the second internal electrode layers 22 may each, for example include the same dielectric ceramic material as that of the dielectric ceramic layers 20.

The first internal electrode layers 21 and the second internal electrode layers 22 each preferably have a thickness of about 0.3 μm or more and about 2.0 μm or less, for example.

The first external electrode 51 is on the first end surface 15 of the laminate 10. In FIG. 1, the first external electrode 51 includes portions that partially overlap the first main surface 11, the second main surface 12, the first lateral surface 13, and the second lateral surface 14. The first external electrode 51 is connected to the first internal electrode layers 21 on the first end surface 15.

The second external electrode 52 is on the second end surface 16 of the laminate 10. In FIG. 1, the second external electrode 52 includes portions that partially overlap the first main surface 11, the second main surface 12, the first lateral surface 13, and the second lateral surface 14. The second external electrode 52 is connected to the second internal electrode layers 22 on the second end surface 16.

For example, the first external electrode 51 and the second external electrode 52 each have a three-layered structure including, in the order from one end surface of the laminate 10, a base electrode layer including Cu which is preferably formed by baking, a first plated layer provided on the surface of the base electrode layer, and a second plated layer provided on the surface of the first plated layer.

As shown in FIG. 3 and FIG. 4, the laminate 10 includes a central layer portion 30 in which each first internal electrode layer 21 and each second internal electrode layer 22 oppose each other with the dielectric ceramic layer 20 therebetween, peripheral layer portions 31 and 32 sandwiching the central layer portion 30 in the lamination (T) direction, and side margins 41 and 42 sandwiching the central layer portion 30, the peripheral layer portion 31, and the peripheral layer portion 32 in the width (W) direction. In FIG. 3 and FIG. 4, the central layer portion 30 is a region that is sandwiched by the first internal electrode layer 21 closest to the first main surface 11 and the first internal electrode layer 21 closest to the second main surface 12 in the lamination (T) direction. Although not shown, the peripheral layer portion 31 and the peripheral layer portion 32 are each preferably defined by the multiple dielectric ceramic layers 20 laminated in the lamination (T) direction.

The dielectric ceramic layers 20 defining the central layer portion 30 are preferably made of, for example, a dielectric ceramic material mainly including $BaTiO_3$, $CaTiO_3$, $SrTiO_3$, $CaZrO_3$, or the like. The dielectric ceramic layers 20 defining the central layer portion 30 may further include a sintering aid element described later.

The dielectric ceramic layers 20 defining the central layer portion 30 each preferably have a thickness of about 0.2 μm or more and about 10 μm or less, for example.

The dielectric ceramic layers 20 defining the peripheral layer portion 31 and the peripheral layer portion 32 are preferably made of, for example, a dielectric ceramic material mainly including $BaTiO_3$, $CaTiO_3$, $SrTiO_3$, $CaZrO_3$, or the like. The dielectric ceramic layers 20 defining the peripheral layer portion and the peripheral layer portion 32 may further include a sintering aid element described later.

The dielectric ceramic layers 20 defining the peripheral layer portion 31 and the peripheral layer portion 32 are preferably made of the same dielectric ceramic material as that of the dielectric ceramic layers 20 defining the central layer portion 30, but may be made of a dielectric ceramic material different from that of the dielectric ceramic layers 20 defining the central layer portion 30.

The peripheral layer portions 31 and 32 each preferably have a thickness of about 15 μm or more and about 40 μm or less, for example. The peripheral layer portions 31 and 32 may each have a multilayer structure or a single-layer structure.

The side margin 41 and the side margin 42 each preferably include multiple ceramic layers laminated in the width (W) direction. In FIG. 4, the side margin 41 preferably includes a three-layered structure of the ceramic layers including an inner layer 41a disposed closest to the laminate 10, an outer layer 41b disposed farthest from the laminate 10, and a buffer layer 41c disposed between the inner layer 41a and the outer layer 41b. Likewise, the side margin 42 preferably includes a three-layered structure of the ceramic layers including an inner layer 42a disposed closest to the laminate 10, an outer layer 42b disposed farthest from the laminate 10, and a buffer layer 42c disposed between the inner layer 42a and the outer layer 42b. The structure of the side margin is not limited to the three-layered structure of the ceramic layers including the inner layer, the outer layer, and the buffer layer, and may be a four- or more layered structure including another ceramic layer between the inner layer and the buffer layer and/or between the outer layer and the buffer layer. The number of ceramic layers may be different between the side margin on the first lateral surface side of the laminate and the side margin on the second lateral surface side of the laminate.

When the side margin has a three-layered structure including the inner layer, the outer layer, and the buffer layer, since the inner layer, the outer layer, and the buffer layer have different sinterability, observation of these layers using an optical microscope, electronic microscope, or the like can confirm that the structure is indeed a three-layered structure. The same applies when the side margin has a four- or more layered structure.

The inner layer 41a and the inner layer 42a are preferably made of, for example, a dielectric ceramic material mainly including $BaTiO_3$, $CaTiO_3$, $SrTiO_3$, $CaZrO_3$, or the like. The inner layer 41a and the inner layer 42a may further include a sintering aid element described later.

The inner layer 41a and the inner layer 42a are preferably made of the same dielectric ceramic material as that of the dielectric ceramic layers 20 defining the central layer portion 30, the peripheral layer portion 31, and the peripheral layer portion 32, but may be made of a dielectric ceramic material different from that of the dielectric ceramic layers 20 defining the central layer portion 30, the peripheral layer portion 31, and the peripheral layer portion 32.

The outer layer 41b and the outer layer 42b are preferably made of, for example, a dielectric ceramic material mainly including $BaTiO_3$, $CaTiO_3$, $SrTiO_3$, $CaZrO_3$, or the like. The outer layer 41b and the outer layer 42b further include a sintering aid element, described later.

The outer layer 41b and the outer layer 42b are preferably made of the same dielectric ceramic material as that of the inner layer 41a and the inner layer 42a, but may be made of a dielectric ceramic material different from that of the inner layer 41a and the inner layer 42a. The outer layer 41b and the outer layer 42b are preferably made of the same dielectric ceramic material as that of the dielectric ceramic layers 20 defining the central layer portion 30, the peripheral layer portion 31, and the peripheral layer portion 32, but may be made of a dielectric ceramic material different from that of the dielectric ceramic layers 20 defining the central layer portion 30, the peripheral layer portion 31, and the peripheral layer portion 32.

In the multilayer ceramic capacitor 1, the outer layer 41b includes a larger amount of a sintering aid element than the inner layer 41a. The outer layer 42b preferably includes a larger amount of the sintering aid element than the inner layer 42a.

In this case, the outer layer can have a higher sinterability than the inner layer. In addition, the outer layer can have a higher hardness than the inner layer. As a result, the outer layer can be made dense.

Examples of the sintering aid element include Si, B, Li, K, Na, Mn, Mg, Ho, Ca, and V. Only one of these sintering aid elements may be used, or two or more of them may be used. When two or more sintering aid elements are used, preferably, the outer layer includes at least one of these elements in an amount larger than that in the inner layer. The same applies to the relationship of the amount of sintering aid elements in the other ceramic layers.

When the amount of the sintering aid element in the outer layer is larger than the amount of the sintering aid element in the inner layer on one lateral surface side, the amount of the sintering aid element in the outer layer may be equal to or smaller than the amount of the sintering aid element in the inner layer on the other lateral surface side.

The type of the sintering aid element and its amount in each ceramic layer can be determined through elemental analysis by wavelength-dispersive X-ray spectroscopy (WDX) of the WT cross section exposed at a substantially center in the longitudinal (L) direction of the multilayer ceramic capacitor.

In the multilayer ceramic capacitor 1, the buffer layer 41c includes a smaller amount of the sintering aid element than the outer layer 41b. The buffer layer 42c includes a smaller amount of the sintering aid element than the outer layer 42b. The buffer layers 41c and 42c do not necessarily include the sintering aid element.

When the buffer layer including a smaller amount of the sintering aid element than the outer layer is between the inner layer and the outer layer, the sintering aid element contained in the outer layer can be retained in the buffer layer, thus preventing spread of the sintering aid element to the dielectric ceramic layer side of the central layer portion. As a result, ceramic grain growth in the central layer portion can be inhibited.

In view of preventing spread of the sintering aid element to the dielectric ceramic layer side of the central layer portion, preferably, the buffer layer 41c includes a smaller amount of the sintering aid element than the inner layer 41a. Preferably, the buffer layer 42c includes a smaller amount of the sintering aid element than the inner layer 42a.

Preferably, the buffer layer 41c and the buffer layer 42c each include a smaller amount of the sintering aid element than the dielectric ceramic layers 20. The amount of the sintering aid element in the dielectric ceramic layers 20 may be equal or substantially equal to or different from the amount of the sintering aid element in each of the inner layers 41a and 42a.

The buffer layer 41c and the buffer layer 42c are preferably made of, for example, a dielectric ceramic material mainly including $BaTiO_3$, $CaTiO_3$, $SrTiO_3$, $CaZrO_3$, or the like. The buffer layer 41c and the buffer layer 42c each may or may not further include a sintering aid element.

The buffer layer 41c and the buffer layer 42c are preferably made of the same dielectric ceramic material as that of the inner layer 41a, the inner layer 42a, the outer layer 41b, and the outer layer 42b, but may be made of a dielectric ceramic material different from that of the inner layer 41a, the inner layer 42a, the outer layer 41b, and the outer layer 42b. The buffer layer 41c and the buffer layer 42c are preferably made of the same dielectric ceramic material as that of the dielectric ceramic layers 20 defining the central layer portion 30, the peripheral layer portion 31, and the peripheral layer portion 32, but may be made of a dielectric ceramic material different from that of the dielectric ceramic layers 20 defining the central layer portion 30, the peripheral layer portion 31, and the peripheral layer portion 32.

When the amount of the sintering aid element in the outer layer is equal to or smaller than the amount of the sintering aid element in the inner layer on one lateral surface side, the side margin on that lateral surface side does not necessarily include the buffer layer. Even when the side margin on that lateral surface side includes the buffer layer, the amount of the sintering aid element in the buffer layer on the relevant lateral surface side may be equal to or more than the amount of the sintering aid element in the outer layer.

In view of maintaining the shape and performance of the multilayer ceramic capacitor 1, the inner layer 41a is preferably thinner than the outer layer 41b. Likewise, the inner layer 42a is preferably thinner than the outer layer 42b.

The buffer layer 41c may be thicker or thinner than the inner layer 41a. The buffer layer 41c may be thicker or thinner than the outer layer 41b. Likewise, the buffer layer 42c may be thicker or thinner than the inner layer 42a. The buffer layer 42c may be thicker or thinner than the outer layer 42b.

The inner layers 41a and 42a each preferably have a thickness of about 0.1 μm or more and about 20 μm or less, for example. The inner layers 41a and 42a preferably have the same or substantially the same thickness.

The outer layers 41b and 42b each preferably have a thickness of about 5 μm or more and about 20 μm or less, for example. The outer layers 41b and 42b preferably have the same or substantially the same thickness.

The buffer layers 41c and 42c each preferably have a thickness of about 0.1 μm or more and about 10 μm or less, for example. The buffer layers 41c and 42c preferably have the same or substantially the same thickness.

The side margins 41 and 42 each preferably have a thickness of about 5 μm or more and about 40 μm or less, and more preferably about 5 μm or more and about 20 μm or less, for example. The side margins 41 and 42 preferably have the same or substantially the same thickness.

The thickness of each ceramic layer of the side margin is an average value from measurements of the thickness of each ceramic layer of the side margin at multiple sites in the lamination (T) direction.

Specifically, the WT cross section is exposed at or substantially at a center in the longitudinal (L) direction of the multilayer ceramic capacitor, and is photographed using an optical microscope or an electronic microscope such that the ends of the first and second internal electrode layers in the width (W) direction and one of the side margins in the WT cross section appear in the same viewing field. The sites to be photographed are an upper portion, a central portion, and a lower portion (three in total) in the lamination (T) direction. In the upper portion, central portion, and lower portion, multiple segments which are parallel or substantially parallel to the width (W) direction are drawn from the ends of the first and second internal electrode layers in the width (W) direction to the lateral surface of the laminate, and the length of each segment is measured. An average value from measurements of the segment length is calculated for each of the upper portion, central portion and lower portion. These average values are further averaged, whereby the thickness of each ceramic layer is determined.

The composition of the ceramic defining each ceramic layer of the side margin 41 may be different from the composition of the ceramic defining the dielectric ceramic layers 20. In this case, the composition of the ceramic defining at least one of the inner layer 41a or the outer layer 41b may be different from the composition of the ceramic defining the dielectric ceramic layers 20.

Likewise, the composition of the ceramic defining each ceramic layer of the side margin 42 may be different from the composition of the ceramic defining the dielectric ceramic layers 20. In this case, the composition of the ceramic defining at least one of the inner layer 42a or the outer layer 42b may be different from the composition of the ceramic defining the dielectric ceramic layers 20.

When the side margin 41 includes three layers including the inner layer 41a, the outer layer 41b, and the buffer layer 41c, the average particle size of the ceramic particles defining the inner layer 41a is preferably larger than the average particle size of the ceramic particles defining the outer layer 41b, the average particle size of the ceramic particles defining the buffer layer 41c, and the average particle size of the ceramic particles defining the dielectric ceramic layers 20. The average particle size of the ceramic particles defining the outer layer 41b may be equal or substantially equal to or different from the average particle size of the ceramic particles defining the dielectric ceramic layers 20.

Likewise, when the side margin 42 includes three layers including the inner layer 42a, the outer layer 42b, and the buffer layer 42c, the average particle size of the ceramic particles defining the inner layer 42a is preferably larger than the average particle size of the ceramic particles defining the outer layer 42b, the average particle size of the ceramic particles defining the buffer layer 42c, and the average particle size of the ceramic particles defining the dielectric ceramic layers 20. The average particle size of the ceramic particles defining the outer layer 42b may be equal or substantially equal to or different from the average particle size of the ceramic particles defining the dielectric ceramic layers 20.

The average particle size of the ceramic particles defining each ceramic layer is an average value determined by photographing a WT cross section of the multilayer ceramic capacitor by a scanning electron microscope (SEM) at a specific magnification to obtain an image, measuring particle sizes of several ceramic particles of any size in the image, and averaging the measurements.

Specifically, the WT cross section is exposed at substantially a center of the multilayer ceramic capacitor in the longitudinal (L) direction, and three sites are photographed at a magnification of 10000 times in each of the dielectric ceramic layer, inner layer, and outer layer at or substantially at a center in the lamination (T) direction to obtain images. Then, 15 or more ceramic particles are selected from the images. The particle size of each ceramic particle selected is measured through image analysis, and the measurements are averaged to determine the average particle size.

Method of Producing Multilayer Ceramic Capacitor

A method of producing a multilayer ceramic capacitor according to the first preferred embodiment of the present invention preferably includes preparing a green chip having a laminated structure including multiple dielectric ceramic layers and multiple pairs of a first internal electrode layer and a second internal electrode layer in a raw state in which the first internal electrode layers and the second internal electrode layers are exposed to a first lateral surface and a second lateral surface that oppose each other in a width direction perpendicular or substantially perpendicular to a lamination direction, producing a raw laminate by forming a raw side margin on each of the first lateral surface and the second lateral surface of the green chip, and sintering the raw laminate. Producing the raw laminate includes forming a raw inner layer on each of the first lateral surface and the second lateral surface and forming a raw outer layer on the outermost side of each of the first lateral surface and the second lateral surface so as to form the raw side margins.

The following describes a non-limiting example embodiment of a method of producing the multilayer ceramic capacitor 1 shown in FIG. 1.

First, a ceramic green sheet that turns into the dielectric ceramic layers 20 is prepared. The ceramic green sheet includes ceramic raw materials that include the dielectric ceramic material, and components such as a binder and a solvent. The ceramic green sheet is preferably formed on a carrier film using a coater such as a die coater, a gravure coater, or a micro gravure coater, for example.

Figure 5A:
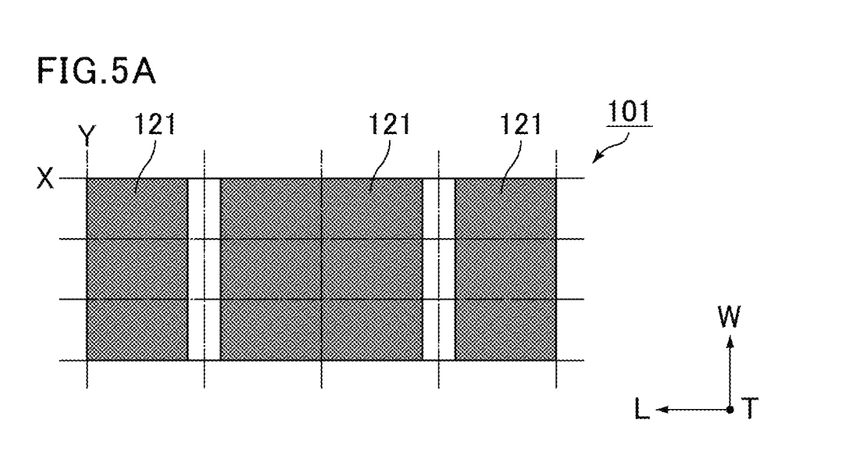
FIGS. 5A to 5C are plan views each schematically showing an example ceramic green sheet according to a preferred embodiment of the present invention.
Figure 5B:
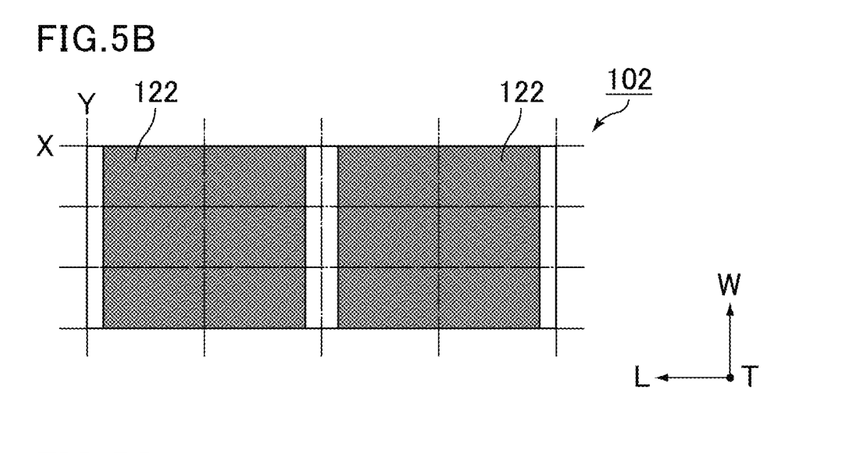
Figure 5C:
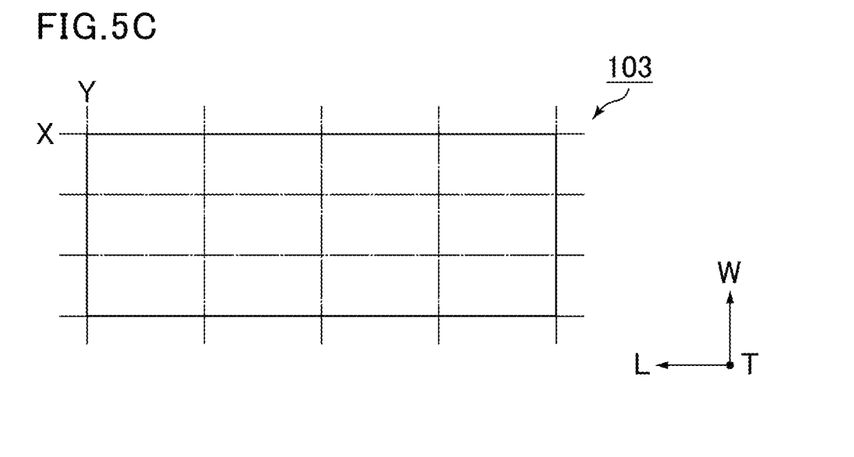

FIGS. 5A to 5C are plan views each schematically showing an example ceramic green sheet.

FIGS. 5A to 5C respectively show a first ceramic green sheet 101 that forms the central layer portion 30, a second ceramic green sheet 102 that forms the central layer portion 30, and a third ceramic green sheet 103 that forms the peripheral layer portion 31 or 32.

In FIGS. 5A to 5C, the first ceramic green sheet 101, the second ceramic green sheet 102, and the third ceramic green sheet 103 are not cut by each multilayer ceramic capacitor 1. FIG. 5A to FIG. 5C show cutting lines X and Y used in cutting the green sheets by each multilayer ceramic capacitor 1. The cutting lines X are parallel or substantially parallel to the longitudinal (L) direction, and the cutting lines Y are parallel or substantially parallel to the width (W) direction.

As shown in FIG. 5A, raw first internal electrode layers 121 corresponding to the first internal electrode layers 21 are formed in the first ceramic green sheet 101. As shown in FIG. 5B, raw second internal electrode layers 122 corresponding to the second internal electrode layers 22 are formed in the second ceramic green sheet 102. As shown in FIG. 5C, the raw internal electrode layers 121 or 122 are not formed in the third ceramic green sheet 103 corresponding to the peripheral layer portion 31 or 32.

The first internal electrode layers 121 and the second internal electrode layers 122 can be formed by using any conductive paste. A method such as screen printing or gravure printing, for example, can be used, for example, to form the first internal electrode layers 121 and the second internal electrode layers 122 with conductive paste.

The first internal electrode layers 121 and the second internal electrode layers 122 are each disposed over two regions adjacent to each other in the longitudinal (L) direction divided by the cutting lines Y, and extend in a band-shaped fashion in the width (W) direction. The first internal electrode layers 121 are shifted by one column relative to the second internal electrode layers 122 in the longitudinal (L) direction divided by the cutting lines Y. In other words, a cutting line Y passing through the center of each first internal electrode layer 121 passes through a region between the second internal electrode layers 122, and a cutting line Y passing through the center of the second internal electrode layer 122 passes through a region between the first internal electrode layers 121.

Subsequently, the first ceramic green sheets 101, the second ceramic green sheets 102, and the third ceramic green sheets 103 are laminated together to produce a mother block.

Figure 6:
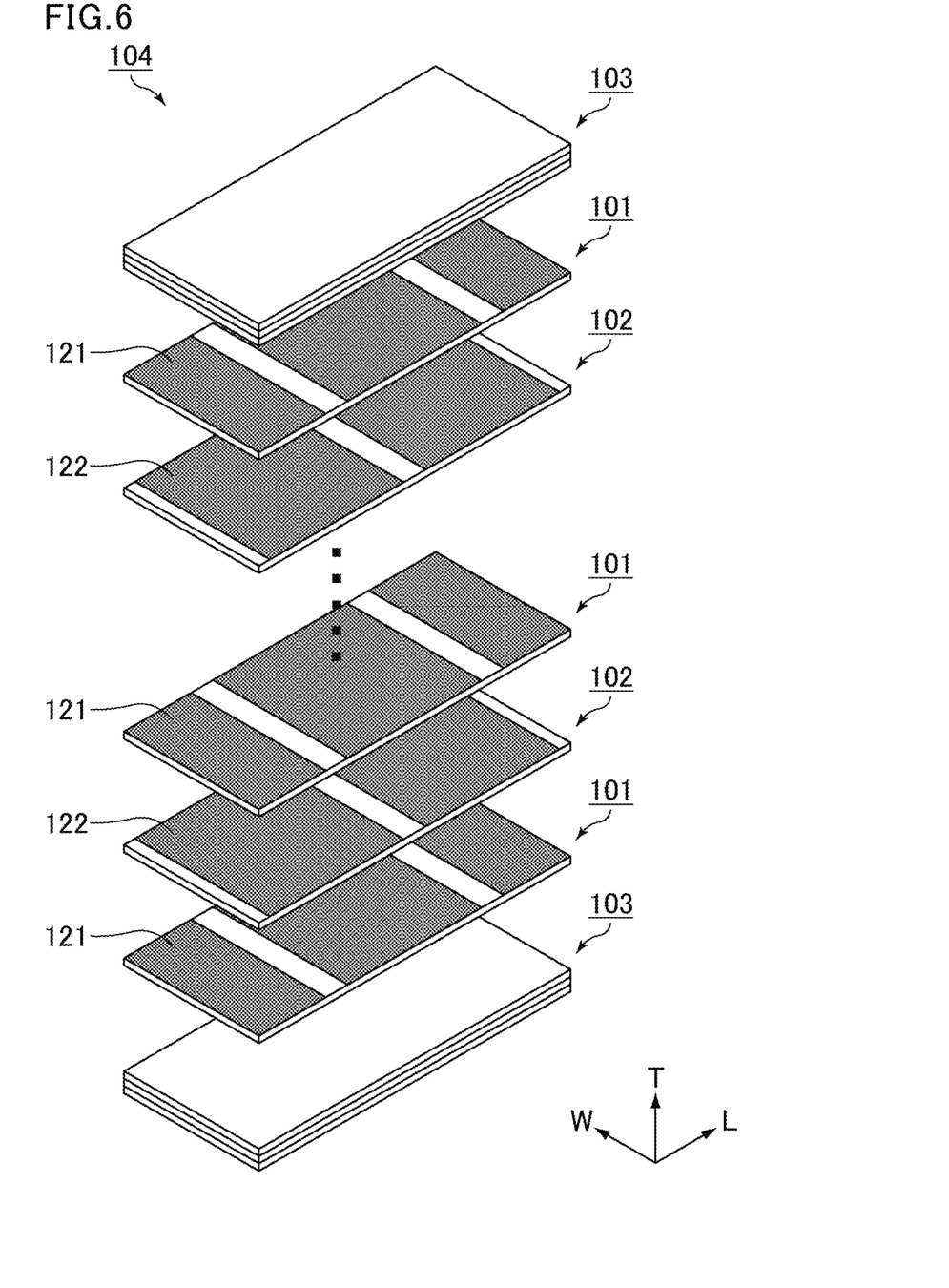
FIG. 6 is an exploded perspective view schematically showing an example of a mother block according to a preferred embodiment of the present invention.

FIG. 6 is an exploded perspective view schematically showing an example mother block.

For the sake of description, FIG. 6 shows an exploded view of the first ceramic green sheets 101, the second ceramic green sheets 102, and the third ceramic green sheets 103. In an actual mother block 104, the first ceramic green sheets 101, the second ceramic green sheets 102, and the third ceramic green sheets 103 are compressed and integrated together by as isostatic pressing, for example.

In the mother block 104 shown in FIG. 6, the first ceramic green sheets 101 and the second ceramic green sheets 102 corresponding to the central layer portion 30 are alternately laminated in the lamination (T) direction. Further, the third ceramic green sheets 103 corresponding to the peripheral layer portions 31 and 32 are laminated on the top and bottom surfaces in the lamination (T) direction of the laminate of the first ceramic green sheets 101 and the second ceramic green sheets 102 which are alternately laminated. While FIG. 6 shows three third ceramic green sheets 103 laminated on each of the top and bottom surfaces, the number of the third ceramic green sheets 103 can be suitably varied.

The resulting mother block 104 is cut along the cutting lines X and Y (see FIGS. 5A to 5C), whereby multiple green chips are produced. A method such as dicing, force-cutting, or laser cutting, for example, is suitably used for the cutting.

Figure 7:
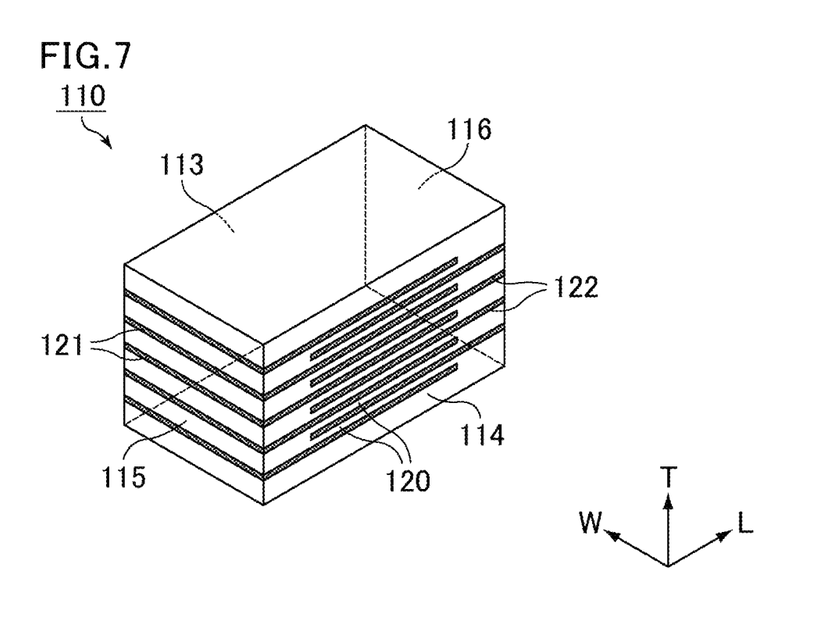
FIG. 7 is a perspective view schematically showing an example green chip according to a preferred embodiment of the present invention.

FIG. 7 is a perspective view schematically showing an example green chip.

A green chip 110 shown in FIG. 7 has a laminated structure including multiple dielectric ceramic layers 120 and multiple pairs of the first internal electrode layers 121 and the second internal electrode layers 122 in a raw state. A first lateral surface 113 and a second lateral surface 114 of the green chip 110 are surfaces that emerge from cutting along a cutting line X, and a first end surface 115 and a second end surface 116 are surfaces that emerge from cutting along a cutting line Y. The first internal electrode layers 121 and the second internal electrode layers 122 are exposed on the first lateral surface 113 and the second lateral surface 114. Only the first internal electrode layers 121 are exposed on the first end surface 115, and only the second internal electrode layers 122 are exposed on the second end surface 116.

Raw side margins are formed on the first lateral surface 113 and the second lateral surface 114 of the green chip 110, whereby a raw laminate is produced. The raw side margins are formed, for example, by bonding side margin ceramic green sheets to the first lateral surface and the second lateral surface of the green chip.

For example, when the side margin includes two layers including the inner layer and the outer layer, first, in order to produce an inner layer ceramic green sheet, ceramic slurry is produced which includes ceramic raw materials that include a dielectric ceramic material mainly including $BaTiO_3$ or the like and components such as a binder and a solvent. A sintering aid may be added to an inner layer ceramic slurry. The inner layer functions as an adhesive to the green chip 110.

Next, in order to produce an outer layer ceramic green sheet, ceramic slurry is produced which includes ceramic raw materials that include a dielectric ceramic material mainly including $BaTiO_3$ or the like and components such as a binder and a solvent. A sintering aid is added to an outer layer ceramic slurry.

Alternatively, in order to produce a buffer layer ceramic green sheet, a ceramic slurry may be produced which includes ceramic raw materials that include a dielectric ceramic material mainly including $BaTiO_3$ or the like and components such as a binder and a solvent. A sintering aid may or may not be added to a buffer layer ceramic slurry.

Here, the amount of the sintering aid in the outer layer ceramic slurry is larger than the amount of the sintering aid in the inner layer ceramic slurry, and the amount of the sintering aid in the buffer layer ceramic slurry is smaller than the amount of the sintering aid in the outer layer ceramic slurry. In addition, preferably, the amount of the sintering aid in the buffer layer ceramic slurry is smaller than the amount of the sintering aid in the inner layer ceramic slurry. The buffer layer ceramic slurry may not include a sintering aid.

The outer layer ceramic slurry is applied to the surface of a resin film and dried, whereby an outer layer ceramic green sheet is formed. The buffer layer ceramic slurry is applied to the surface of the outer layer ceramic green sheet on the resin film and dried, whereby a buffer layer ceramic green sheet is formed. The inner layer ceramic slurry is applied to the surface of the buffer layer ceramic green sheet and dried, whereby an inner layer ceramic green sheet is formed. Thus, a side margin ceramic green sheet having a three-layered structure is obtained.

The side margin ceramic green sheet having a three-layered structure can also be obtained, for example, by forming the outer layer ceramic green sheet, the buffer layer ceramic green sheet, and the inner layer ceramic green sheet in advance and bonding them together. The structure of the side margin ceramic green sheet is not limited to the three-layered structure, and may be a four- or more layered structure.

Then, the side margin ceramic green sheet is separated from the resin film.

Subsequently, the inner layer ceramic green sheet of the side margin ceramic green sheet is placed to oppose the first lateral surface 113 of the green chip 110, and preferably press-punched, for example, whereby the raw side margin 41 is formed. Further, the inner layer ceramic green sheet of the side margin ceramic green sheet is placed to oppose the second lateral surface 114 of the green chip 110, and press-punched, whereby the raw side margin 42 is formed. Here, an organic solvent that defines and functions as an adhesive is preferably applied to the lateral surface of the green chip in advance.

The green chip 110 on which the raw side margins 41 and are formed is degreased under predetermined conditions, for example, in a nitrogen atmosphere, and then sintered at a predetermined temperature, for example, in a mixture atmosphere of nitrogen, hydrogen, and steam. Thus, the sintered laminate 10 (see FIG. 2) is obtained.

External electrode paste mainly including Cu is applied to and baked on each of the first end surface 15 and the second end surface 16 of the laminate 10A, whereby a base electrode layer connected to the first internal electrode layers 21 and a base electrode layer connected to the second internal electrode layers 22 are formed. Further, a first plated layer is preferably formed by Ni plating on the surface of each base electrode layer, and a second plated layer is preferably formed by Sn plating on the surface of each first plated layer, for example. Thus, the first external electrode 51 and the second external electrode 52 are formed.

The multilayer ceramic capacitor 1 shown in FIG. 1 is produced as described above.

The raw side margin may be formed by bonding the side margin ceramic green sheet or applying the side margin ceramic slurry to each lateral surface of the green chip.

When the raw side margin is formed by applying the side margin ceramic slurry, the inner layer ceramic slurry is applied to each lateral surface of the green chip and dried. Further, the buffer layer ceramic slurry is applied to the surface of the resulting inner layer and dried. Subsequently, the outer layer ceramic slurry is applied to the surface of the resulting buffer layer.

Alternatively, the side margin may be formed by masking both end surfaces of the green chip with resin or the like, dipping the green chip entirely into the inner layer ceramic slurry, drying the green chip, dipping the dried green ship into the buffer layer ceramic slurry, drying the green chip, and dipping the green ship into the outer layer ceramic slurry. In this case, the inner layer, the buffer layer, and the outer layer are also formed on the peripheral layer portion, resulting in a four-layered structure.

Second Preferred Embodiment

Multilayer Ceramic Capacitor

The multilayer ceramic capacitor according to the second preferred embodiment of the present invention is different from the multilayer ceramic capacitor according to the first preferred embodiment of the present invention in that the side margins each include multiple ceramic layers laminated in the width direction, and the ceramic layers include an inner layer disposed closest to the laminate, an outer layer disposed farthest from the laminate, and a buffer layer disposed between the inner layer and the outer layer and having a lower elastic modulus than the inner layer and the outer layer.

FIG. 1 to FIG. 4 each also schematically show an exemplary multilayer ceramic capacitor according to the second preferred embodiment of the present invention. The multilayer ceramic capacitor 1 shown in FIG. 1 preferably has the same or substantially the same features as those of the first preferred embodiment of the present invention, except for the following points.

The inner layer 41a and the inner layer 42a are preferably made of, for example, a dielectric ceramic material mainly including $BaTiO_3$, $CaTiO_3$, $SrTiO_3$, $CaZrO_3$, or the like. The inner layer 41a and the inner layer 42a may further include a sintering aid element described later.

The inner layer 41a and the inner layer 42a are preferably made of the same dielectric ceramic material as that of the dielectric ceramic layers 20 defining the central layer portion 30, the peripheral layer portion 31, and the peripheral layer portion 32, but may be made of a dielectric ceramic material different from that of the dielectric ceramic layers 20 defining the central layer portion 30, the peripheral layer portion 31, and the peripheral layer portion 32.

The outer layer 41b and the outer layer 42b are preferably made of, for example, a dielectric ceramic material mainly including $BaTiO_3$, $CaTiO_3$, $SrTiO_3$, $CaZrO_3$, or the like. Preferably, the outer layer 41b and the outer layer 42b further include a sintering aid element described later.

The outer layer 41b and the outer layer 42b are preferably made of the same dielectric ceramic material as that of the inner layer 41a and the inner layer 42a, but may be made of a dielectric ceramic material different from that of the inner layer 41a and the inner layer 42a. The outer layer 41b and the outer layer 42b are preferably made of the same dielectric ceramic material as that of the dielectric ceramic layers 20 defining the central layer portion 30, the peripheral layer portion 31, and the peripheral layer portion 32, but may be made of a dielectric ceramic material different from that of the dielectric ceramic layers 20 defining the central layer portion 30, the peripheral layer portion 31, and the peripheral layer portion 32.

In the multilayer ceramic capacitor 1, the buffer layer 41c has a lower elastic modulus than the inner layer 41a and the outer layer 41*b*. The buffer layer 42*c* has a lower elastic modulus than the inner layer 42*a* and the outer layer 42*b*.

When the buffer layer having a lower elastic modulus than the inner layer and the outer layer is disposed between the inner layer and the outer layer, stress externally applied to the side margin can be reduced or prevented by the side margin. As a result, the multilayer ceramic capacitor is less prone to cracking and chipping.

Herein, the elastic modulus means Young's modulus (longitudinal elastic modulus).

When the elastic modulus of the buffer layer is lower than that of the inner layer and the outer layer on one lateral surface side, the side margin on the other lateral surface side does not necessarily include the buffer layer. Even when the side margin on the other lateral surface side includes the buffer layer, the elastic modulus of the buffer layer on the relevant lateral side may be equal to or higher than that of the inner layer and the outer layer.

The buffer layer 41*c* and the buffer layer 42*c* are preferably made of a dielectric ceramic material different from that of the inner layer 41*a*, the inner layer 42*a*, the outer layer 41*b*, and the outer layer 42*b*. The buffer layer 41*c* and the buffer layer 42*c* may each preferably be made of, for example, a flexible ceramic material including two or more ceramic components each having a different coefficient of thermal expansion. The buffer layer 41*c* and the buffer layer 42*c* each may or may not include a sintering aid element described later.

Specifically, preferably, the buffer layer 41*c* and the buffer layer 42*c* are each preferably made of a flexible ceramic material including a lower thermal expansion ceramic component having a coefficient of thermal expansion of about $2 \times 10^{-6}/°$ C. or less and a higher thermal expansion ceramic component having a coefficient of thermal expansion higher than that of the lower thermal expansion ceramic component by about $5 \times 10^{-6}/°$ C. or more, for example.

As described in JP 4381760 B, the flexible ceramic material is obtained, for example, by mixing one type of ceramic particles having an average particle size of about 100 μm or more and about 500 μm or less with the other type of ceramic particles having an average particle size of about 10 μm or less, molding the mixture, and sintering the molded body. The difference in coefficient of thermal expansion between the particles results in cracks in the form of three-dimensionally continuous open pores at grain boundaries, whereby a flexible ceramic material is obtained. In the thus-obtained flexible ceramic material, the percentage of the crack is preferably about 5 vol % or more and about 20 vol % or less, for example.

A combination of ceramic components to define a composite is, for example, (1) a combination of a lower thermal expansion ceramic component whose ceramic particles have an average particle size of about 100 μm or more and about 500 μm or less and a higher thermal expansion ceramic component as the grain boundary phase whose ceramic particles have an average particle size of about 10 μm or less, or (2) a combination of a higher thermal expansion ceramic component whose ceramic particles have an average particle size of about 100 μm or more and about 500 μm or less and a lower thermal expansion ceramic component as the grain boundary phase whose ceramic particles have an average particle size of about 10 μm or less. The average particle size is a number average particle size. The lower limit of the ceramic particles having a smaller average particle size is not limited. Even when the particle size is about 0.1 μm, there is no particular problem.

In the flexible ceramic material, the space between packed ceramic particles having a larger average particle size is filled with ceramic particles having a smaller average particle size. Usually, when ceramic particles are packed, the volume fraction of the ceramic particles is, for example, about 50 vol % or more and about 60 vol % or less, and the remaining volume fraction of about 40 vol % or more and about 50 vol % or less is the space between the ceramic particles. The space is filled with ceramic particles having a smaller average particle size. Thus, unless the proportion of the ceramic particles having a smaller average particle size relative to the ceramic particles having a larger average particle size is about 50 vol % or more, these particles are not densely packed as a whole, leaving gaps which are not cracks.

Generation of cracks is associated with average particle size and difference in coefficient of thermal expansion. Cracks are generated as the average particle size increases, even when the difference in coefficient of thermal expansion is small. In the case where the difference in coefficient of thermal expansion between two types of ceramic particles is about $5 \times 10^{-6}/°$ C. or more and about $10 \times 10^{-6}/°$ C. or less, cracks are generated when the ceramic particles of one type have an average particle size of about 100 μm or more and about 500 μm or less and the ceramic particles of the other type have an average particle size of 10 μm or less.

In particular, the flexible ceramic material preferably includes a lower thermal expansion ceramic component having a coefficient of thermal expansion of about $2 \times 10^{-6}/°$ C. or less and a higher thermal expansion ceramic component having a coefficient of thermal expansion of about $20 \times 10^{-6}/°$ C. or more. Use of such lower thermal expansion ceramic component and higher thermal expansion ceramic component allows grain boundaries to be prone to cracking.

Examples of the lower thermal expansion ceramic component include potassium zirconium phosphate ($KZr_2(PO_4)_3$) having a coefficient of thermal expansion of about $-0.4 \times 10^{-6}/°$ C. Examples of the higher thermal expansion ceramic component include leucite ($KAlSi_2O_6$) having a coefficient of thermal expansion of about $25 \times 10^{-6}/°$ C.

The ceramic particles used to form a composite are preferably those of two types of components that do not react during sintering. The ceramic particles having an average particle size of about 100 μm or more and about 500 μm or less are preferably those obtained by sintering single-phase particles having an average particle size smaller than about 100 μm. Secondary particles having a larger average particle size of about 100 μm or more and about 500 μm or less are first produced and then mixed with the other component, i.e., the ceramic particles having a smaller average particle size. Subsequently, the mixture is solidified as a whole by sintering only the smaller ceramic particles, whereby a reaction of two types of components during sintering can be prevented.

Cooling after sintering such a combination of ceramic components generates three-dimensional cracks at grain boundaries of the sintered body. With regard to generation of microcracks, stress is determined by (difference in coefficient of thermal expansion between two components)×(particle size)×(ultimate temperature difference between sintering temperature and temperature after cooling (usually, room temperature)) at an interface between the two components. Thus, the cooling rate is not much relevant.

The porosity is preferably about 5 vol % or more and about 20 vol % or less, for example, which is equivalent to the porosity of naturally occurring flexible itacolumite. The porosity is an open porosity measured by the Archimedes method using the sample weight, apparent volume, and the like.

The outer layer 41b preferably includes a larger amount of a sintering aid element than the inner layer 41a. The outer layer 42b preferably includes a larger amount of the sintering aid element than the inner layer 42a.

In this case, the outer layer can have a higher sinterability than the inner layer. In addition, the outer layer can have a higher hardness than the inner layer. As a result, the outer layer can be made dense.

Examples of the sintering aid element include Si, B, Li, K, Na, Mn, Mg, Ho, Ca, and V. Only one of these sintering aid elements may be used, or two or more of them may be used. When two or more sintering aid elements are used, preferably, the outer layer includes at least one of these elements in an amount larger than that in the inner layer. The same applies to the relationship of the amount of sintering aid elements in other ceramic layers.

When the amount of the sintering aid element in the outer layer is larger than the amount of the sintering aid element in the inner layer on one lateral surface side, the amount of the sintering aid element in the outer layer may be equal to or smaller than the amount of the sintering aid element in the inner layer on the other lateral surface side.

In view of maintaining the shape and performance of the multilayer ceramic capacitor 1, the inner layer 41a is preferably thinner than the outer layer 41b. Likewise, the inner layer 42a is preferably thinner than the outer layer 42b.

The buffer layer 41c may be thicker or thinner than the inner layer 41a. The buffer layer 41c may be thicker or thinner than the outer layer 41b. Likewise, the buffer layer 42c may be thicker or thinner than the inner layer 42a. The buffer layer 42c may be thicker or thinner than the outer layer 42b.

The inner layers 41a and 42a each preferably have a thickness of about 0.1 μm or more and about 10 μm or less, for example. The inner layers 41a and 42a preferably have the same or substantially the same thickness.

The outer layers 41b and 42b each preferably have a thickness of about 5 μm or more and about 20 μm or less, for example. The outer layers 41b and 42b preferably have the same or substantially the same thickness.

The buffer layers 41c and 42c each preferably have a thickness of about 0.1 μm or more and about 10 μm or less, for example. The buffer layers 41c and 42c preferably have the same or substantially the same thickness.

The side margins 41 and 42 each preferably have a thickness of about 5 μm or more and about 40 μm or less, more preferably about 5 μm or more and about 20 μm or less, for example.

The side margins 41 and 42 preferably have the same or substantially the same thickness.

The composition of the ceramic defining each ceramic layer of the side margin 41 may be different from the composition of the ceramic defining the dielectric ceramic layers 20. In this case, the composition of the ceramic defining at least one of the inner layer 41a or the outer layer 41b may be different from the composition of the ceramic defining the dielectric ceramic layers 20.

Likewise, the composition of the ceramic defining each ceramic layer of the side margin 42 may be different from the composition of the ceramic defining the dielectric ceramic layers 20. In this case, the composition of the ceramic defining at least one of the inner layer 42a or the outer layer 42b may be different from the composition of the ceramic defining the dielectric ceramic layers 20.

When the side margin 41 includes three layers including the inner layer 41a, the outer layer 41b, and the buffer layer 41c, the average particle size of the ceramic particles defining the inner layer 41a is preferably larger than the average particle size of the ceramic particles defining the outer layer 41b, the average particle size of the ceramic particles defining the buffer layer 41c, and the average particle size of the ceramic particles defining the dielectric ceramic layers 20. The average particle size of the ceramic particles defining the outer layer 41b may be substantially equal to or different from the average particle size of the ceramic particles defining the dielectric ceramic layers 20.

Likewise, when the side margin 42 includes two layers including the inner layer 42a, the outer layer 42b, and the buffer layer 42c, the average particle size of the ceramic particles defining the inner layer 42a is preferably larger than the average particle size of the ceramic particles defining the outer layer 42b, the average particle size of the ceramic particles defining the buffer layer 42c, and the average particle size of the ceramic particles defining the dielectric ceramic layers 20. The average particle size of the ceramic particles defining the outer layer 42b may be substantially equal to or different from the average particle size of the ceramic particles defining the dielectric ceramic layers 20.

Method of Producing Multilayer Ceramic Capacitor

A preferred embodiment of a method of producing the multilayer ceramic capacitor according to the second preferred embodiment of the present invention preferably includes preparing a green chip including a laminated structure including multiple dielectric ceramic layers and multiple pairs of a first internal electrode layer and a second internal electrode layer in a raw state in which the first internal electrode layers and the second internal electrode layers are exposed to a first lateral surface and a second lateral surface that oppose each other in a width direction perpendicular or substantially perpendicular to a lamination direction, producing a raw laminate by forming a raw side margin on each of the first lateral surface and the second lateral surface of the green chip; and sintering the raw laminate.

Producing the raw laminate includes forming a raw inner layer on each of the first lateral surface and the second lateral surface and forming a raw outer layer on the outermost side of each of the first lateral surface and the second lateral surface, and forming a raw buffer layer between the inner layer and the outer layer so as to form the raw side margins.

Unlike the first preferred embodiment of the present invention, the second preferred embodiment of the present invention includes producing ceramic slurry including ceramic raw materials that include the lower thermal expansion ceramic component and the higher thermal expansion ceramic component and components such as a binder and a solvent, in order to produce a buffer layer ceramic green sheet. A sintering aid may be added to the buffer layer ceramic slurry.

The multilayer ceramic capacitor according to the second preferred embodiment of the present invention can preferably be produced as in the first preferred embodiment of the present invention, except for the above points.

The present invention is not limited to the above preferred embodiments. Various modifications and changes can be made to the structures, production conditions, and the like of the multilayer ceramic capacitor and the multilayer ceramic electronic component without departing from the gist of the present invention.

In the above preferred embodiment, the mother block 104 is preferably cut along the cutting lines X and Y to produce multiple green chips, and the raw side margin is formed on each lateral surface of the green chip. Yet, the preferred embodiment may be modified.

Specifically, the mother block may be cut only along the cutting lines X to produce multiple rod-shaped green blocks in which the first internal electrode layers and the second internal electrode layers are exposed to lateral surfaces that emerged from the cutting along the cutting lines X. Then, the raw side margins are formed on the lateral surfaces of each green block, and the green blocks are cut along the cutting lines Y to produce multiple raw laminates, followed by sintering of the raw laminates. After sintering, the same steps as in the preferred embodiment described above are performed, whereby multilayer ceramic electronic components such as multilayer ceramic capacitors can be produced.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
    a laminate including multiple dielectric ceramic layers and multiple pairs of a first internal electrode layer and a second internal electrode layer laminated in a lamination direction, and including:
        a first main surface and a second main surface that oppose each other in the lamination direction;
        a first lateral surface and a second lateral surface that oppose each other in a width direction perpendicular or substantially perpendicular to the lamination direction; and
        a first end surface and a second end surface that oppose each other in a longitudinal direction perpendicular or substantially perpendicular to the lamination direction and the width direction;
    a first external electrode on the first end surface of the laminate and connected to the first internal electrode layer on the first end surface; and
    a second external electrode on the second end surface of the laminate and connected to the second internal electrode layer on the second end surface; wherein
    the laminate further includes:
        a central layer portion in which each first internal electrode layer and each second internal electrode layer oppose each other with a dielectric ceramic layer of the multiple dielectric ceramic layers therebetween;
        peripheral layer portions sandwiching the central layer portion in the lamination direction; and
        side margins sandwiching the central layer portion and the peripheral layer portions in the width direction; and
    the side margins each include multiple ceramic layers laminated in the width direction, and the ceramic layers include an inner layer disposed closest to the laminate, an outer layer disposed farthest from the laminate and including a larger amount of a sintering aid element than the inner layer, and a buffer layer disposed between the inner layer and the outer layer and including a smaller amount of the sintering aid element than the outer layer.

2. The multilayer ceramic electronic component according to claim 1, wherein the buffer layer includes a smaller amount of the sintering aid element than the inner layer.

3. The multilayer ceramic electronic component according to claim 1, wherein the inner layer is thinner than the outer layer.

4. The multilayer ceramic electronic component according to claim 1, wherein ceramic defining each ceramic layer of the side margin has a composition different from a composition of a ceramic defining the dielectric ceramic layers.

5. The multilayer ceramic electronic component according to claim 1, wherein
    the side margin includes three layers including the inner layer, the outer layer, and the buffer layer; and
    ceramic particles defining the inner layer have an average particle size larger than an average particle size of ceramic particles defining the outer layer and an average particle size of ceramic particles defining the dielectric ceramic layers.

6. The multilayer ceramic electronic component according to claim 1, wherein the sintering aid element includes at least one of Si, B, Li, K, Na, Mn, Mg, Ho, Ca, and V.

7. The multilayer ceramic electronic component according to claim 1, wherein the buffer layer does not include any of the sintering aid element.

8. The multilayer ceramic electronic component according to claim 1, wherein the buffer layer includes a same dielectric ceramic material as is contained in the inner layer and the outer layer.

9. The multilayer ceramic electronic component according to claim 1, wherein
    the inner layer has a thickness of about 0.1 μm or more and about 20 μm or less;
    the outer layer has a thickness of about 5 μm or more and about 20 μm or less; and
    the buffer layer has a thickness of about 0.1 μm or more and about 10 μm or less.

10. A multilayer ceramic electronic component comprising:
    a laminate including multiple dielectric ceramic layers and multiple pairs of a first internal electrode layer and a second internal electrode layer laminated in a lamination direction, and including:
        a first main surface and a second main surface that oppose each other in the lamination direction;
        a first lateral surface and a second lateral surface that oppose each other in a width direction perpendicular or substantially perpendicular to the lamination direction; and
        a first end surface and a second end surface that oppose each other in a longitudinal direction perpendicular or substantially perpendicular to the lamination direction and the width direction;
    a first external electrode on the first end surface of the laminate and connected to the first internal electrode layer on the first end surface; and
    a second external electrode on the second end surface of the laminate and connected to the second internal electrode layer on the second end surface; wherein
    the laminate further includes:
        a central layer portion in which each first internal electrode layer and each second internal electrode layer oppose each other with a dielectric ceramic layer of the multiple dielectric ceramic layers therebetween;

peripheral layer portions sandwiching the central layer portion in the lamination direction; and side margins sandwiching the central layer portion and the peripheral layer portions in the width direction; and the side margins each include multiple ceramic layers laminated in the width direction, and the ceramic layers include an inner layer closest to the laminate, an outer layer farthest from the laminate, and a buffer layer disposed between the inner layer and the outer layer and having a lower elastic modulus than the inner layer and the outer layer.

11. The multilayer ceramic electronic component according to claim 10, wherein the buffer layer is made of a flexible ceramic material including a lower thermal expansion ceramic component having a coefficient of thermal expansion of about $2\times10^{-6}/°$ C. or less and a higher thermal expansion ceramic component having a coefficient of thermal expansion higher than that of the lower thermal expansion ceramic component by about $5\times10^{-6}/°$ C. or more.

12. The multilayer ceramic electronic component according to claim 10, wherein the outer layer includes a larger amount of a sintering aid element than the inner layer.

13. The multilayer ceramic electronic component according to claim 10, wherein the buffer layer is made of a flexible ceramic material.

14. The multilayer ceramic electronic component according to claim 13, wherein the flexible ceramic material includes two or more ceramic components each having a different coefficient of thermal expansion.

15. The multilayer ceramic electronic component according to claim 12, wherein the sintering aid element includes at least one of Si, B, Li, K, Na, Mn, Mg, Ho, Ca, and V.

16. The multilayer ceramic electronic component according to claim 12, wherein the buffer layer does not include any of the sintering aid element.

* * * * *